Nov. 23, 1965 T. ONGARO 3,218,853
FLOW RATE MEASURING DEVICE
Filed Aug. 28, 1961 3 Sheets-Sheet 1

INVENTOR.
THEODORE ONGARO
BY
Schmieding and Fultz
ATTORNEYS

Nov. 23, 1965  T. ONGARO  3,218,853
FLOW RATE MEASURING DEVICE
Filed Aug. 28, 1961  3 Sheets-Sheet 2
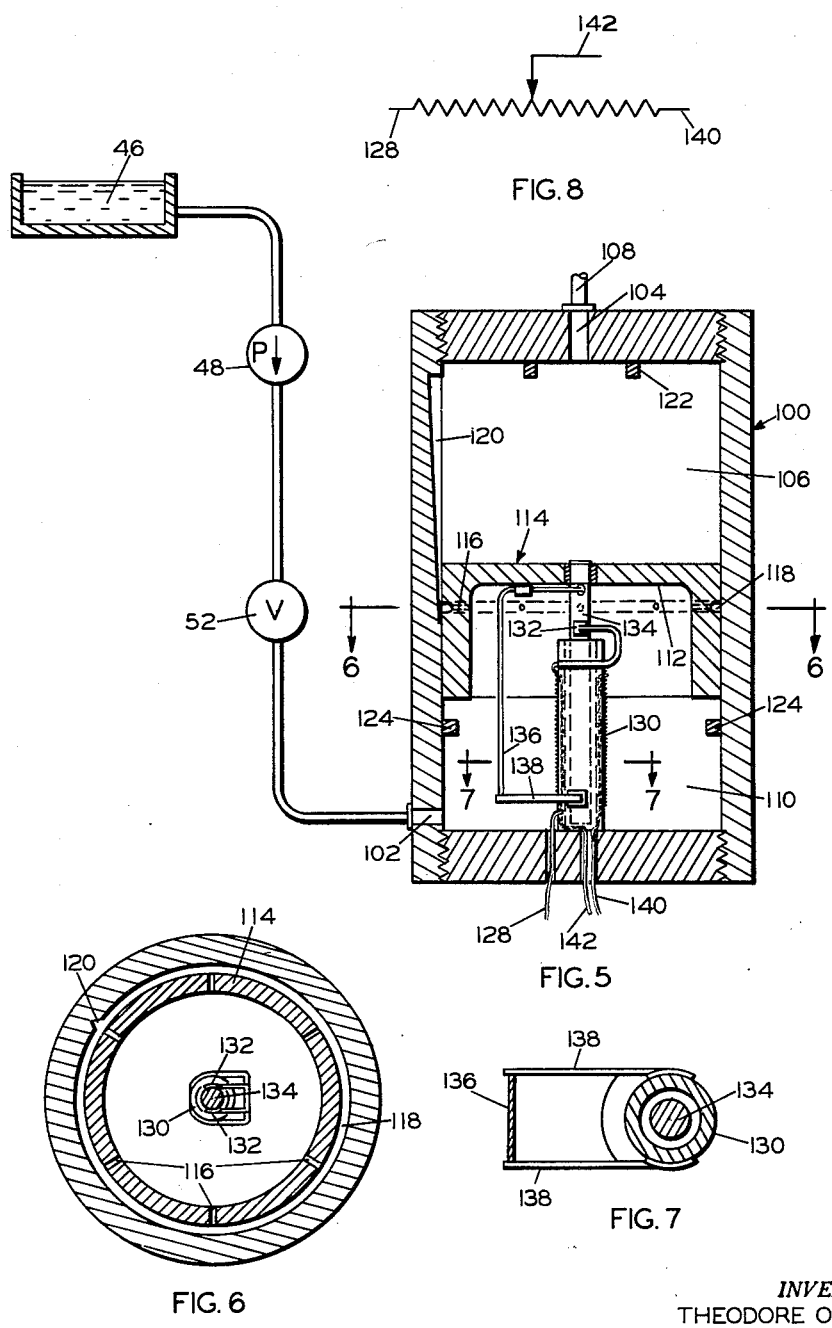
INVENTOR.
THEODORE ONGARO
BY
Schmieding and Fultz
ATTORNEYS Nov. 23, 1965     T. ONGARO     3,218,853
FLOW RATE MEASURING DEVICE
Filed Aug. 28, 1961     3 Sheets-Sheet 3

*INVENTOR.*
THEODORE ONGARO

BY *Schmieding and Fultz*
*ATTORNEYS*

3,218,853
FLOW RATE MEASURING DEVICE
Theodore Ongaro, Columbus, Ohio, assignor to Ongaro Dynamic Industries, Inc., Columbus, Ohio, a corporation of Ohio
Filed Aug. 28, 1961, Ser. No. 134,472
3 Claims. (Cl. 73—208)

This invention relates to flow rate measuring devices.

This application is a continuation-in-part of my co-pending application Serial No. 61,921, filed October 11, 1960, now abandoned.

In general, the apparatus of the present invention includes a housing means that forms a cylinder with a pressure responsive member movably mounted therein.

The pressure responsive member separates the housing into a chamber of relatively high pressure that is connected to the source of flowing fluid and a low pressure chamber that is connected to a zone of relatively low pressure.

In one modification of the present invention the pressure responsive member is in the form of a movable wall or pison means provided with a central orifice into which is extended the tapered end portion of a tapered member mounted inside the housing means.

When the flowing fluid passes through the housing means it exerts a force on the pressure responsive member and this force establishes equilibrium with the force exerted by an opposing biasing means whereby the pressure responsive member establishes a position of floating equilibrium.

When the differential of pressure between the high pressure chamber and the low pressure chamber varies, the piston means is moved relative to the tapered member whereby the effective size of the orifice in the piston means is varied. With this arrangement any variations in the rate of fluid flow through the orifice in the piston means causes the piston means to move longitudinally of the cylinder and establish itself at a new location corresponding to the fluid flow rate occurring at the particular time.

The apparatus further includes a suitable sensing means for determining the location of the piston means relative to the housing means. The sensing means either directly indicates the flow rate corresponding to the location of the piston means or by using an appropriate transducer and flow rate gauge a flow rate reading can be delivered to a remote location.

In another modification of the present invention the previously mentioned movable wall provided with an orifice and tapered pin construction is replaced by a piston means that moves along a cylindrical surface provided with a tapered slot. The piston means and tapered slot are arranged to provide an aperture, between a low pressure chamber and a high pressure chamber of progressively varying area as the piston means moves longitudinally of the cylinder. Here again, the piston means is maintained in free flowing equilibrium by the force of the flowing fluid and is adapted to establish itself at various positions depending on the volumetric flow rate of the fluid passing through the device.

In another modification of the present invention the device includes a movable wall means that comprises a rigid end wall portion provided with an orifice for receiving the previously mentioned tapered pin and a flexible side wall portion that forms a low friction seal between the wall means and the surrounding casing means. This modification can be used where high sensitivity is required in low or high pressure systems. Moreover, this modification clearly eliminates fluid leakage between the movable wall means and the surrounding casing portion.

As still another modification of the present invention extremely high sensitivity is obtained, for relatively low pressure systems, by forming the movable wall means so as to include a bellows shaped membrane thin side wall portion that is spaced from the casing means whereby all friction and fluid leakage is eliminated between the movable wall means and the casing means.

As one aspect of the present invention, the apparatus, due to its unique and inherently sensitive construction can detect minute rates of flow in the range of .01 gallon per hour and at the same time relatively high rates of flow in the range of 10 gallons or more per hour.

As another aspect of the present invention, the apparatus will function at either relatively high or ultra-low fluid pressures from a few ounces to thousands of pounds.

As another aspect of the present invention the apparatus senses fluid flow rates with a high degree of accuracy, provided temperatures are held stable, with a repeatable + or − error of five percent.

As another aspect of the present invention, the apparatus measures flow rates with very low inherent errors at either high temperatures or low temperatures providing the temperature fluctuations at a particular operating range are not excessive.

It is, therefore, an object of the present invention to provide a fluid flow measuring device that operates at both high and ultra-low pressures and which measures minute flow rates with high accuracy.

It is another object of the present invention to provide a flow rate measuring apparatus of the type described that can be operated at either high temperature ranges or low temperature ranges without loss of the inherent accuracy of the apparatus.

It is another object of the present invention to provide an apparatus of the type described that incorporates high sensitivity of response to minute variations in flow rate.

Further objects and advantages of the present invention will be apparent from the following description, reference being had to the accompanying drawings wherein preferred forms of embodiments of the invention are clearly shown.

In the drawings:

FIG. 5 is a side sectional view of a modified flow rate measuring device constructed in accordance with the present invention, the section being taken along a vertical plane through the center line of the device;

FIG. 6 is a top sectional view of the apparatus of FIG. 5, the section being taken along the line 6—6 of FIG. 5;

FIG. 7 is a partial top sectional view of the apparatus of FIG. 5 the section being taken along the line 7—7 of FIG. 5;

FIG. 8 is a diagrammatic view of the position sensing means circuit comprising a portion of the apparatus of FIGS. 5 through 7;

Figure 1:
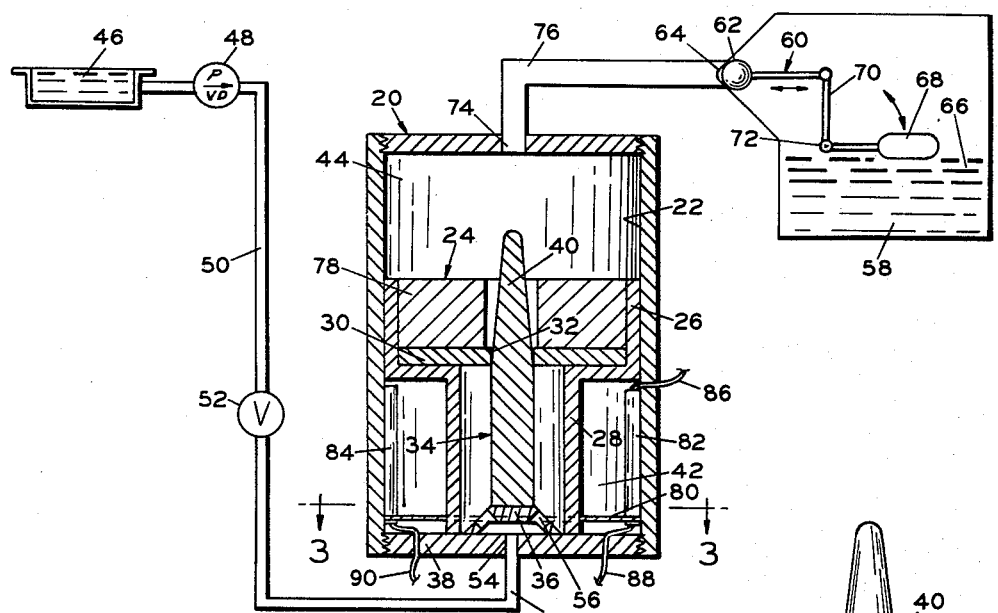
FIG. 1 is a side sectional view of a flow rate measuring device constructed in accordance with the present invention, the section being taken along a vertical plane through the center line of the device.

Referring in detail to FIGS. 1 through 4 of the drawings, flow rate measuring device of the present invention includes a housing means indicated generally at 20 that includes an inner cylindrical wall 22 that movably carries a pressure responsive member which is illustrated in the form of a movable wall or piston means indicated generally at 24.

Piston means 24 includes a generally cup-shaped portion 26 of larger diameter and a depending portion 28 of smaller diameter.

The portion 26 of piston means 24 carries an orifice plate 30 that forms an orifice or aperture 32.

A tapered member 34 includes a base portion 36 secured to a bottom wall 38 of housing means 20. Member 34 further includes a tapered tip portion 40 extended into orifice 32 such that when piston means 24 moves upwardly from the position of FIG. 1 to the position of FIG. 2 the effective area of orifice 32 progressively increases.

Piston means 24 separates housing means 20 into a chamber 42 of relatively high pressure and a chamber 44 of relatively low pressure.

Chamber 42 receives pressurized fluid from a source 46 via pump 48, line 50, shut-off valve 52, intake port 54, and openings 56 in the base of tapered member 34.

Low pressure chamber 44 is arranged to release fluid to reservoir 58 which can be at atmospheric pressure, in an open system, or at some positive pressure value less than the pressure of the fluid from pump 48 depending on the particular system.

A valve mechanism indicated generally at 60 includes a movable ball element 62 adapted to engage a seat 64 when the surface level 66 drops in reservoir 58. When level 66 drops a float 68 follows the level and pivots lever 70 about center 72 whereby ball 62 is moved away from seat 64. This permits fluid to pass from low pressure chamber 44 to reservoir 58 via outlet port 74 and line 76.

It should be pointed out that the flow rate measuring device of the present invention can be utilized either with or without valve means 60 and reservoir 58. For example, housing means 20 can be connected into a closed fluid circuit which would not include valve means 60 and low pressure reservoir 58.

Piston means 24 carries an annular weight 78 that serves as a biasing means for continuously urging the piston means downwardly.

For purposes of the present invention the "biasing means" is the action of gravity acting on the mass of piston means 24 and weight 78. It will be understood, however, that for non-vertical operation the biasing means can be in the form of a mechanical or pneumatic spring, or the biasing can be achieved magnetically without departing from the spirit of the present invention.

The depending portion 28 of piston means 24 carries a conductor element 80 that engages and connects stationary contacts 82 and 84 throughout the axial extent of the path of travel of piston means 24.

Figure 4:
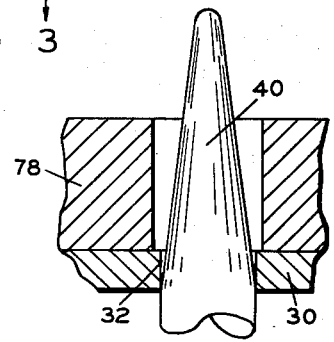
FIG. 4 is a side sectional view of an orifice and tapered member comprising a portion of the device of the preceding figures, the section being taken along a vertical plane through the center line of the device.
Figure 2:
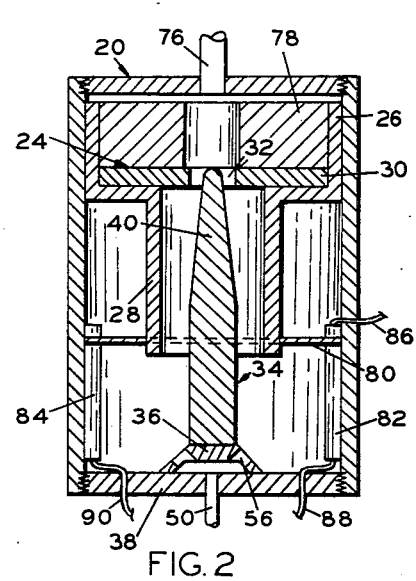
FIG. 2 is a second side sectional view of the device of FIG. 1, the section being taken along a vertical plane through the center line of the device.
Figure 3:
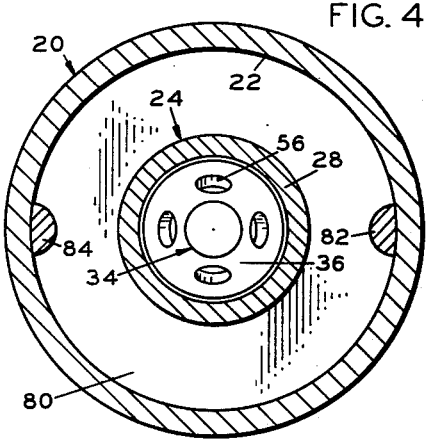
FIG. 3 is a top sectional view showing a portion of the device of the preceding figures, the section being taken along the line 3—3 of FIG. 1.

Bottom wall 38 of housing means 20 serves as a stop for limiting the downward movement of piston means 24 and when the lower end of depending portion 28 of the piston means engages the stop 38 orifice 32 will be at a threshold position relative to tapered tip portion 40. The threshold position is illustrated in FIG. 4.

Wires 86, 88, and 90 are in circuit with a suitable gauge that indicates flow rates in volumetric units per unit time.

With reference to tapered member 34, this element is shown in the drawings as being rigidly mounted on end wall 38. If desired, this member can be pivotally mounted to the end wall whereby it can align itself with orifice 32 without departing from the spirit of the present invention. Tapered member 34 is pivotally mounted relative to end wall 38 whereby the necessity of closely holding the concentricity of orifice 32 and tapered member 34 is eliminated.

With reference to FIG. 1, the length of depending piston portion 28 is such that orifice 32 will be at a threshold position, that is just ready to open upon upward movement of the piston means when depending member 28 is bottomed on end wall 38. At this position there is practically no flow of fluid between high pressure chamber 42 and low pressue chamber 44.

In operation, when pressurized fluid is released from a source, such as pump 48, and flows into high pressure chamber 42, it exerts a force on the under surface of piston means 24. Since the piston means is free to float as soon as the upwardly exerted force is great enough to overcome the force exerted downwardly by piston means 24 and weight 78 then piston means 24 will move upwardly and raise orifice 32 away from the threshold position. Fluid then flows into low pressure chamber 44 and outwardly through conduit 76 and valve means 60 to reservoir 58.

It will be understood that a pressure drop occurs across orifice 32 whereby the pressure in high pressure chamber 24 will always be slightly greater than the pressure in low pressure chamber 44 when piston means 24 is in any given position of equilibrium for any given flow rate.

When the flow rate demand is increased as will occur when the surface level 66 of reservoir 58 drops, valve element 62 will move away from seat 64 and permit fluid to flow from low pressure chamber 44 via conduit 76. In order to supply the demand the flow through orifice 32 increases with an increase in the pressure drop across orifice 32. This produces an upwardly directed unbalanced force on piston means 24 which causes the piston means to arise and establish itself at a new equilibrium position at the increased flow rate.

If the flow through the system for any reason decreases, there will be a corresponding decrease in the pressure drop across orifice 32 whereby the upwardly directed force exerted on piston means 24 decreases with the corresponding lowering of the position of piston means 24 relative to the casing means. The piston means will then establish itself at a new lower position of equilibrium.

The relationship of the forces exerted on piston means 24 can be expressed by the following formula:

$$P_1 A_1 = P_2 A_2 + W + F$$

where:

$P_1$ = the pressure in high pressure chamber 42
$A_1$ = the area of the underside of piston means 24
$P_2$ = the pressure in low pressure chamber 44
$A_2$ = the area of the top side of piston means 24
$W$ = the weight of the piston means or biasing force
$F$ = total viscous and mechanical friction forces of the system By examining the above formula it will be understood that it is desirable to keep the friction forces F at a minimum in order to achieve sensitivity of response. The friction forces F, however, are effectively overcome in the present apparatus by making the areas $A_1$ and $A_2$ sufficiently great to achieve an operable balance between the various forces without the occurrence of fluid flow past the movable wall except at the control aperture or orifice.

It is also desirable to make the areas $A_1$ and $A_2$ of the piston means 24, large, if the pressures $P_1$ and $P_2$ are low, in order to minimize the retarding forces of the friction forces F.

Reference is next made to FIGS. 5 through 7 which illustrate a modified flow measuring apparatus constructed in accordance with the present invention. The device includes a housing means indicated generally at 100 provided with an intake port 102 connected with a source of pressurized fluid 48. An outlet port 104 releases fluid from a low pressure chamber 106 to a zone of relatively low pressure via outlet line 108.

The pressurized fluid from source 48 enters a high pressure chamber 110 and exerts a force on the area of an underside 112 of a piston means indicated generally at 114.

High pressure fluid can pass from high pressure chamber 110 to low pressure chamber 106 via a plurality of radial passages 116, annular collector passage 118 and a tapered passage 120. The total area of radial passages 116 is always greater than the effective area of the aperture formed by tapered passage 120, the area of which progressively increases as piston means 114 moves upwardly.

The upper movement of the piston means 114 is arrested by stops 122 and the lower movement of the piston means is arrested by stops 124.

The apparatus of FIGS. 5 through 8 includes a variable resistance sensing means that includes a coil 130 that is preferably in the form of a glass insulated conductor. When piston means 114 moves upwardly movable contact 138 is moved axially along resistor coil 130 whereby the resistance is varied in accordance with the location of piston means 114 in housing means 100.

As seen in FIG. 5 and FIG. 8, wire 128 is connected to the bottom of resistor coil 130 and wire 140 extends upwardly within the coil and is connected to the top end thereof. Wire 142 is connected to stationary contacts 132 which slidably engage movable contact rod 134, the top of said contact rod being rigidly connected to piston means 114. The slidable contacts 138 that move along resistor coil 130 are connected to the top of movable contact rod 134 by a conductor strip 136.

The simple circuit is shown in FIG. 8 wherein it will be noted that wire 142 is connected to the slidable contact that is moved longitudinally along the resistor coil 130 as the position of the piston means 114 is varied responsive to variations in the flow rate through the variable aperture formed by tapered passage 120, annular collector passage 118, and radial passages 116.

It should be pointed out that in the embodiment of FIGS. 5 through 8 the force of gravity is utilized to bias piston means 114 towards high pressure chamber 110 whereby freely floating equilibrium is established between the upwardly exerted fluid pressure on piston means 114 and the downwardly acting biasing force.

It will be understood that for non-vertical operation the biasing force could be provided by mechanical or pneumatic spring means or the piston means could be biased magnetically without departing from the spirit of the present invention.

Figure 9:
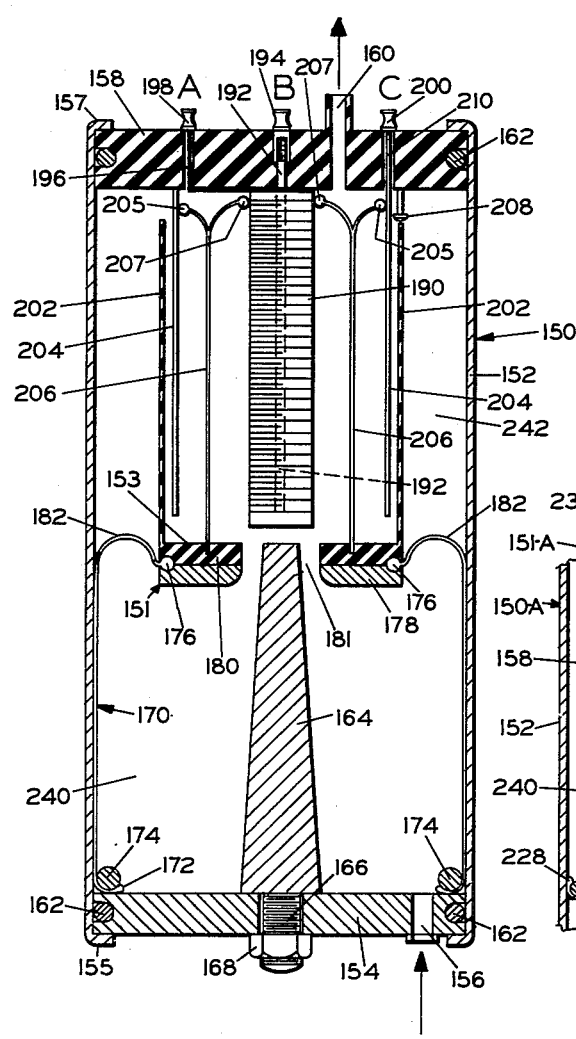
FIG. 9 is a side sectional view of another modified flow rate measuring device constructed in accordance with the present invention, the section being taken along a vertical plane through the center line of the device.

Reference is next made to FIG. 9 which illustrates a modified flow sensing apparatus that is used in instances where extra high sensitivity is desired in either low or high pressure systems.

The apparatus includes a casing means indicated generally at 150 that includes a top wall 158 and a bottom wall 154, said walls being retained in place by crimps 157 and 155.

Annular seals 162 are provided between the end walls and the cylindrical side wall 152 of the casing means.

The apparatus includes a movable wall means indicated generally at 151 that comprises an end wall portion 153 formed of a circular dielectric element 180 and a circular metal element 178 between which is clamped a circular bead 176 of a roll-type diaphragm or flexible side wall section 170. The side wall section 170, to permit highly sensitive response, also comprises an arcuate end section between the bead 176 and the upright members of section 170. The lower end of flexible side wall section 170 is retained in sealed engagement with the inner surface of cylindrical side wall 152 by an annular metal retainer 174, the lower end of flexible side wall portion 170 being provided with an annular bead 172.

An orifice 181 is formed in end wall portion 153 so as to surround the upper end of a tapered member 164.

When movable wall means 151 moves longitudinally of the casing means the effective area of orifice 181 is increased or decreased depending upon the direction of movement.

The lower end of tapered member 164 includes a threaded shank portion 166 extended through a hole in bottom wall 154 and provided with a nut 168 for removably mounting the tapered member in the casing means.

A plurality of contact carriers 206 are mounted on circular dielectric element 180 and include slidable contacts 205 that engage the inner surface of a metal conductor cylinder 204 and slidable contacts 207 that engage a variable resistor 190.

One end of variable resistor 190 is connected to a contact 198 via a wire 196 and the other end of variable resistor 190 is connected to a contact 194 by a conductor rod 192.

Figure 10:
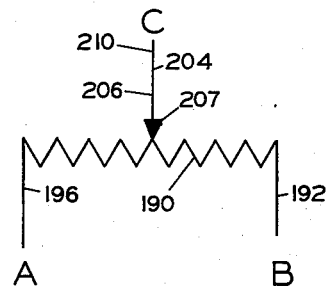
FIG. 10 is a diagrammatic view of a position sensing means circuit comprising a portion of the apparatus of FIGS. 9 and 11.

Variable resistor 190 and its associated elements are diagrammatically illustrated in FIG. 10. If desired, the upward movement of movable wall means 151 can be limited by a stop 208 mounted on top wall 158 which stop is engaged by the upper end of an outer cylindrical member 202.

An intake port 156 admits fluid to a high pressure chamber 240 and an outlet port 207 releases fluid from a low pressure chamber 242. Outlet port 160 leads to a valve mechanism 60 and reservoir 58 of the type illustrated in FIG. 1 and inlet port 156 is connected to a source of pressurized fluid such as the pump 48 illustrated in FIG. 1.

The operation of the apparatus of FIGS. 9 and 10 is identical to that previously described in connection with the apparatus of FIGS. 1–8. The apparatus of FIG. 9, however, achieves higher sensitivity since the roll-type flexible diaphragm 170 rolls, with a low coeffiecient of friction, along the inner surface of the casing means.

Figure 11:
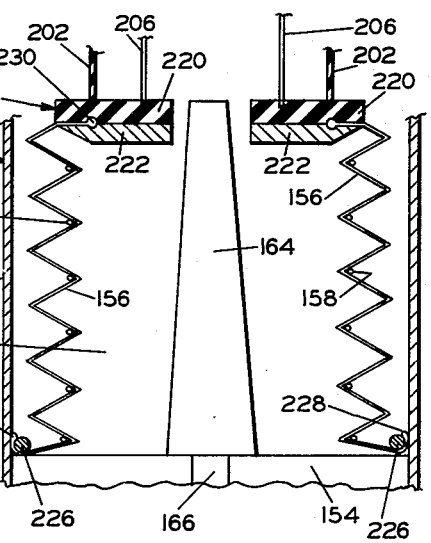
FIG. 11 is a partial side sectional view of still another modified flow rate measuring device constructed in accordance with the present invention, the section being taken along a vertical plane through the center line of the device.

Reference is next made to FIG. 11 which illustrates still another modified apparatus constructed in accordance with the present invention. The apparatus of FIG. 11 is identical to that of FIG. 9 except that the movable wall means 151–A includes a bellows type flexible side wall portion 156 that is provided with a plurality of single loop metal rings 158. Since bellows type side wall portion 156 is formed of extremely thin flexible membrane material, .004 or .005 of an inch in thickness, the fine wire loops 158 serve to reinforce the membrane thin side wall portion 156 against outwardly exerted fluid pressures in high pressure chamber 240.

By way of example, wiring diameter of .004 of an inch has been found suitable for reinforcing bellows type side wall portions that are .004 or .005 of an inch thick.

It should be pointed out that the bellows type side wall portion 156 provides ultra-high sensitivity since there is no sliding friction between piston means 151–A and the inner surface of casing wall 152. For this reason the extremely sensitive apparatus of FIG. 11 can be used with fluid pressures as low as .001 of a pound per square inch. For systems having fluid pressures above ten pounds per square inch, the square inch the roll type diaphragm 170 of FIG. 9 is recommended since it is an inherently stronger design than the extremely sensitive bellows type of FIG. 11.

It should be pointed out that with the bellows type membrane 156 of FIG. 11 only a molecular internal friction exists thus insuring the minimum of internal hystersis which makes it possible to rigidly and constantly achieve maximum accuracy where extremely minute flows are being measured.

The flexible membrane 156 of FIG. 11 can be formed of elastometric material, thin metallic sheet, or any other suitable flexible material.

While the forms of embodiments of the present invention as herein disclosed constitute preferred forms, it is to be understood that other forms might be adopted, all coming within the scope of the claims which follow.

I claim:
1. A flow rate measuring device comprising a housing having a base at a first end and a closure at its second end, input means for introducing into said first end of said housing a fluid to be measured and outlet means for discharging said fluid at said second end, piston means in sliding contact with the inner surface of said housing and movable in response to fluid flow between said first and second ends, means providing a variable orifice in the inner surface of said housing comprising a longitudinal tapered groove formed extending generally in the direction of piston movement from a beginning position beyond the rearmost portion of said piston when said piston is positioned nearest to the first of said ends and increasing in depth from its beginning position near said first end of said housing surface in the direction of said second end, means provided to connect said tapered groove in fluid communication with the fluid introduced into said first end as said piston moves toward said second end before the rearmost portion thereof passes the beginning position of said groove to render said groove cooperatively operative with said movable piston and permit varying amounts of fluid to enter into said second end corresponding to the variations in said flow rate of said fluid entering said first end; a sensing indicator having an electrical means including an element fixedly positioned at one of said ends of said housing and a variable element electrically engaging said first element and positioned on said movable piston.

2. A flow rate measuring device comprising an upright housing having an inner cylindrical surface, a base at its lower end, and a closure at its upper end; input means for introducing into said lower end of said housing a fluid to be measured and outlet means for discharging said fluid at said upper end, piston means in fluid tight sliding contact with the inner cylindrical surface of said housing and movable in response to fluid flow between said lower and upper ends, said piston being normally urged toward said lower end in opposition to said fluid flow; means providing a variable orifice in said inner cylindrical surface comprising a longitudinal tapered groove formed extending generally in the direction of piston movement from a beginning position above the lowest portion of the piston when said piston is in its lowermost position and increasing in depth from its beginning position near said base end in the direction of said upper end, means provided to connect said tapered groove in fluid communication with the fluid introduced into said lower end as said piston moves upwardly before the lower portion thereof passes the beginning position of said groove to render said groove cooperatively operative with said movable piston and permit varying amounts of fluid to enter into said upper end corresponding to the variations in the flow rate of said fluid entering said lower end; an electrical sensing indicator including electrical means fixedly positioned at one end of said housing and a variable element electrically engaging said means fixedly positioned on said movable piston.

3. A flow rate measuring device as set forth in claim 2 wherein said fluid communication with said tapered groove further comprises an orifice in said movable piston.

References Cited by the Examiner
UNITED STATES PATENTS

| | | | |
|---|---|---|---|
| 299,737 | 6/1884 | Chapin | 73—208 |
| 701,382 | 6/1902 | Patten | 73—208 |
| 1,027,250 | 5/1912 | Hartung | 73—210 |
| 1,416,220 | 5/1922 | Long et al. | 73—210 |
| 1,874,858 | 8/1932 | Beckwith et al. | 137—400 |
| 2,070,374 | 2/1937 | Sherwood | 73—209 |
| 2,091,792 | 8/1937 | Niesemann | 73—208 |
| 2,329,142 | 9/1943 | Shank | 73—210 |
| 2,372,166 | 3/1945 | McCarty | 73—208 |
| 2,727,388 | 12/1955 | Ekstrom | 73—208 |

RICHARD C. QUEISSER, *Primary Examiner.*

DAVID SCHONBERG, *Examiner.*